Jan. 27, 1953     W. W. CRILEY     2,626,453

METHOD OF MAKING FORGED BLANKS AND FORGINGS

Filed Feb. 9, 1948

INVENTOR.
WILLIAM W. CRILEY
BY
Oberlin & Limbach
ATTORNEYS

Patented Jan. 27, 1953

2,626,453

UNITED STATES PATENT OFFICE 2,626,453

METHOD OF MAKING FORGED BLANKS AND FORGINGS

William W. Criley, Shaker Heights, Ohio, assignor to The Ajax Manufacturing Company, Euclid, Ohio, a corporation of Ohio Application February 9, 1948, Serial No. 7,074

1 Claim. (Cl. 29—148)

This invention relates to a method of forming metal blanks from bar or billet stock and particularly to a method of forming forged steel blanks having elongated reduced or tapered end portions.

For the purposes of illustration, the method is described herein as applied in the production of blanks from which spindles for the front wheels of automobiles are produced, its application to other types of blanks being apparent from the illustrative example.

In general, front wheel spindles of automobiles as presently used, while varying in detail, comprise essentially an elongated tapered spindle portion for rotatably supporting the wheel and an eye or yoke adapted to receive a pivot for mounting the spindle on the front axle of the vehicle.

Such spindles are generally made from bar stock by roll forging one end portion of a length of stock or billet toward its extremity from an intermediate portion to provide an elongated portion which is tapered from the main body or intermediate portion of the metal toward the one end, then reversing the billet end for end and shaping it by roll forging the other end portion in like manner to produce a tapered portion at the latter end of the billet. The billet resulting from these operations comprises a central or intermediate portion from the ends of which end portions which taper toward the extremities of the roll forged billet extend in opposite directions. Subsequently, the billet thus formed is placed in suitable impression dies and forged, the tapered portions forming the spindle portion of the final forging and the larger cross sectional midportion or intermediate portion of the billet forming the yoke or eye portion of the final forging. By this prior method, two forgings are formed from a single length of billet which is preformed by two roll forging operations as above described, the yoke portions being adjacent each other and the spindle portions projecting in opposite directions therefrom, respectively, and the forgings being connected together by flash metal.

This prior method has serious objections. For example, if the billet is reduced rapidly by roll forging, the surface metal flows to a greater extent than the core of metal, thus producing on each end what is commonly termed a "pipe" or a "fish tail," that is, a deep crease or notch which extends entirely across the end, and is open at the end, of the billet.

The "fish tail" or "pipe" can be eliminated by reducing the end portions of the billet more gradually in the roll forging stages but in such event, the time consumed is so great as to render the method expensive. Otherwise, the "fish tailed" end must be cropped or thrown into the tong hold or flash of the forging with a consequent loss of metal. In any event a double blank thus formed requires double handling of the billet in the forging rolls and twice as many forging rolls for maintaining a given production.

According to the present invention, all of these difficulties are overcome by a single handling of the billet in connection with the forging roll operations, twice as many blanks are produced in much less time by the same personnel, only half as many forging rolls are required for supplying a given forging press, the billet is held by the same end throughout the roll forging operations, greater reduction in cross section is obtained in the larger passes of the roller dies, and the very objectionable "fish tailing" is entirely eliminated, with the result that metal is conserved, cropping of the blank is eliminated, and better and more uniform blanks are provided.

One of the principal objects of the present invention is to produce more efficiently from bar or billet stock, blanks having reduced end portions.

Another object is to reduce the time and number of forging rolls required for roll forging billets into blanks for spindles and the like, and to eliminate the loss of metal and the undesirable "fish tailing" which occur in the prior methods.

Other objects and advantages will become apparent from the following description, wherein reference is made to the drawings, in which:

Fig. 1 is a diagrammatic cross sectional view of a pair of forging rolls and their associated dies used in practicing the present method;

Figs. 2, 3, and 4 are diagrammatic cross sectional views of the roller dies and are taken on lines 2—2, 3—3, and 4—4, respectively, of Fig. 5;

Fig. 5 is a top plan view of the lower roller die illustrated in Figs. 1 through 4 showing four roll forging stages;

Figs. 6, 7, and 8 are diagrammatic illustrations of the throats of the roller dies and are taken on lines 6—6, 7—7, and 8—8, respectively, of Fig. 5;

Figure 1:
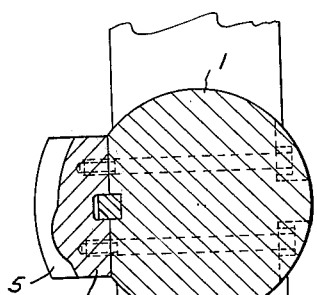

Referring to Fig. 1, a pair of forging rolls is illustrated and comprises an upper or top roll 1 and a lower or bottom roll 2, these rolls being provided with a top die 3 and a lower die 4, respectively, the dies being secured to the rolls by suitable bolts as illustrated. The dies 3 and 4 are arranged to provide a plurality of grooves for forming a billet of bar or billet stock into a blank of the shape desired.

Figure 2:
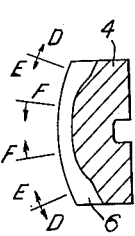
Figure 3:
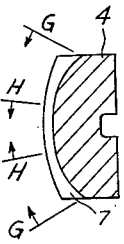
Figure 4:
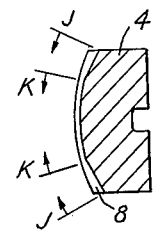

In the illustrative example, four sets of grooves, each set comprising a different roll forging stage, are provided. Since the top and bottom dies are symmetrical, only the die 4 is illustrated in Figs. 2 through 4. The grooves comprising the four stages are indicated at 5, 6, 7, and 8, respectively, in Figs. 1 through 4, respectively. In plan view of the bottom die 4, shown in Fig. 5, the grooves 5 through 8, correspond respectively, to roll forging stages I through IV.

Figure 6:
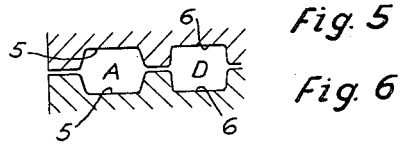
Figure 7:
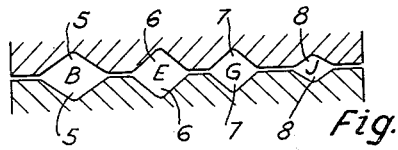
Figure 8:
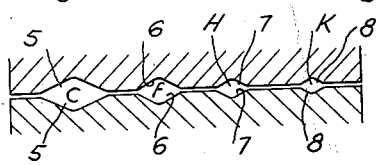

In Figs. 6, 7, and 8, there are shown diagrammatically the cross sectional shapes of the co-operating grooves at various distances therealong from the mouths or entrance ends, each figure being taken progressively farther from the mouths.

Figure 5:
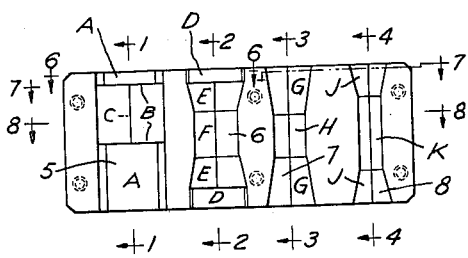

The circumferential limits of the different portions of each groove are indicated in Figs. 1 through 4 by the radial lines and designations A—A through K—K, lines bearing corresponding letters being used to represent the corresponding portions of the grooves in Fig. 5, and corresponding letters being used to indicate corresponding portions in Figs. 6 through 8.

Figure 9:
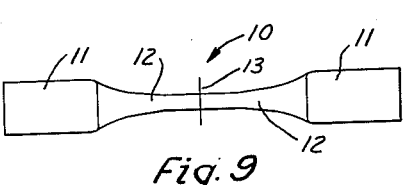
Fig. 9 is a side elevation of a blank produced by the roller dies of Figs. 1 through 8.

The rolls thus illustrated provide a roll forged billet 10 such as illustrated in Fig. 9. The billet is preferably forged from round cornered square billet stock of a size depending upon the size of the blank required. As illustrated in Fig. 9, the roll forged billet 10 has end portions 11 which are substantially the same size as the original stock. The end portions 11 are preferably unchanged in cross section during the roll forging operation, but may be reduced slightly during roll forging if desired. The bar stock or billet is shaped by passing it through the successive stages or sets of grooves of the forging roll dies, rotating the billet about its axis between successive passes, by which it is reduced at a portion between its ends, preferably at its mid-portion, in the first stage and then gradually reduced progressively farther at the mid-portion and therefrom toward the end portions 11 in successive stages. As a result, a dual blank is formed having end portions 11 of greater cross section than the intermediate or mid-portions 12. The lengths of the end portions 11 and portions 12 may vary considerably depending upon the particular forging to be forged from the blank. The blank thus forged is cut in two crosswise at or near the longitudinal center, as indicated by the line 13 in Fig. 9, thus forming two blanks which usually are approximately identical. In severing the two end portions of the blanks along the line 13, care is taken to make a straight-across clean cut.

Thus, by roll forging a single billet, while holding it by the same end throughout all of the roll forging operations, so as to reduce the cross section of an intermediate portion and taper the intermediate portion outwardly toward the end portions and cutting the roll forged billet in two at a longitudinally intermediate portion, two blanks are produced. The labor and time of handling is reduced as the stock is forged while held at the same end at all times during roll forging. Furthermore, "fish tailing" is entirely eliminated.

Figures 10, 11:
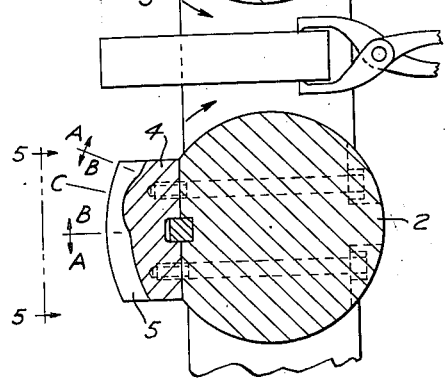
Fig. 10 is a side elevation of a forging forged from one of the blanks of the present invention by one forging method.
Fig. 11 is a side elevation of another forging forged from a blank of the present invention illustrating another manner of forging.

The two resultant blanks thus roll forged lend themselves to different methods of forging. As one example, each of the resultant blanks may be forged singly flatwise in impression dies. Thus a forging such as illustrated in Fig. 10 may be produced, the forging comprising a front wheel spindle 14 having a spindle portion 15 and eye 16, the flash metal being indicated at 17. Allowance of metal for gripping by the usual tongs is made in the length of the portion 12 of each blank when roll forging the billet 10, the portion so allowed being indicated at 18 in Fig. 10. This method is particularly desirable in the case of round cornered billet stock of from three to three and one-half inches to the side.

As another example, such a spindle forging may be forged singly by upending one of the resultant roll forged blanks. The forging thus produced is illustrated in Fig. 11, the forging being indicated generally at 19 and comprising a tapered spindle portion 20, and eye portion 21, the flash metal being indicated at 22. This method is particularly useful when using round cornered billet stock of from two to two and one-half inches to the side.

In each of these illustrative examples, it is apparent that the shape of the portion 12 of the blank may be so close to the shape of spindle portion desired that very little additional change therein need occur in the die to form the spindle portion, such as indicated at 15 in Fig. 10 and at 20 in Fig. 11. The absence of any "fish tail" or "pipe" at the small end of the blank is particularly important when the blank is to be forged by up ending, as described in connection with Fig. 11.

Figure 12:
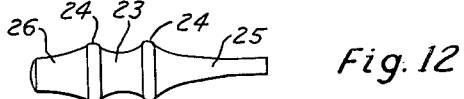
Fig. 12 is a side elevation of a modified form of blank.
Figure 13:
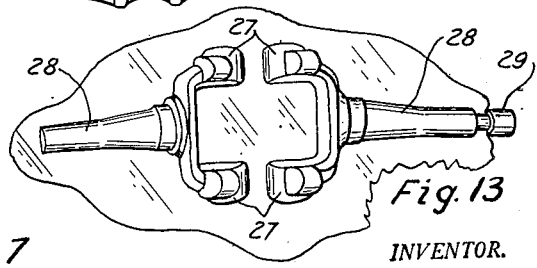
Fig. 13 is a pair of automobile front wheel spindle forgings formed from the blank illustrated in Fig. 12.

Referring next to Fig. 12, a blank similar to one of the blanks formed by cutting in two crosswise at its reduced intermediate portion a roll forged billet such as illustrated in Fig. 9 to form two resultant blanks is provided. In this connection it must be noted that the portions 11 of the billet should be somewhat longer than in the former examples to provide sufficient metal for an additional spindle forging. The resultant blank thus formed may be fullered or drawn before the impression die forming operations. For example, such a blank, comprising one end portion 11 and reduced elongated portion 12 may be fullered to the shape illustrated in Fig. 12 in the same press or hammer as is used for the impression die forming operations. This is done by forming a reduced neck 23 between the ends of the enlarged portion 11 of the blank with enlargements indicated at 24 jumped up at each end of the reduced portion 23. The portion 25 remains the same as the portion 12 of the original blank. Simultaneously, the extremity or free end of the enlarged portion 11 is reduced and tapered, as indicated at 26. Approximately three blows of the press or hammer are sufficient for these operations. The blank illustrated in Fig. 12 is next placed in suitable impression dies in which it is forged to the shape illustrated in Fig. 13, thus producing two spindle forgings having their yoke portions 27 adjacent each other and their spindle portions 28 extending in opposite directions therefrom, the two spindle forgings being formed simultaneously from the blank illustrated in Fig. 12. In such a die forming operation, the portion 26 of the blank will flow readily without excessive flash so as to form one of the spindle portions 28, whereas the other spindle portion 28 is formed by the already tapered portion 25 of the blank.

Thus, two blanks may be rolled simultaneously at one handling without a "fish tail" or loss of stock. By following the modification of the practice as described in connection with Figs. 12 and 13, blanks for producing four spindle forgings are rolled by a single rolling operation. In this instance also, allowance is made in the portions 12 of the billet to provide a tong grip 29 on the blank.

It has been found that blanks can be reduced more than 50% in cross section in the larger passes by the roll forging operation described without any "fish tailing," which is a much greater reduction than is possible without "fish tailing" when it is attempted to roll forge a billet in accordance with the prior method wherein the billet is tapered from an intermediate or mid-portion toward the end. The reduction of the mid-portion instead of the ends not only provides a mechanical reinforcement to reduce the possibility of "fish tailing" but also conserves the heat at the smallest cross section from which it would normally dissipate rapidly were the smallest cross section at the free ends of the main body of the metal. Accordingly, in the present method, the metal blanks are formed from elongated billets by reducing the cross section of a portion thereof between the ends and then cutting the billet in two with a clean cut crosswise, preferably at the longitudinal mid-portion of the reduced cross section thereby producing two blanks which are substantially duplicates of each other or are sufficiently near duplicates for all practical purposes. It is apparent, however, that variations may be made when the blank is rolled so that it is not symmetrical about a longitudinal mid-portion and such use is of advantage in those instances wherein forgings of considerably different shape from each other are being made during a given run of the press. Thus, the press or die space may be used to advantage in such instances by forming two differently shaped articles at the same time, the blank being roll forged so that when cut in two at a portion of small cross section, though at some point spaced from the mid-portion, one severed part can be used for forging of one shape, and the other severed part for a forging of a different shape. Though the method has been shown for purposes of illustration as applied to front wheel spindle forgings, it is apparent that it is useful for many other types of forgings, a few examples being turbine blades, yokes, turnbuckle jaws, gasoline engine connecting rods, and other forgings having enlarged heads and comparatively slender bodies or shanks.

Having thus described my invention, I claim:

The method of forming a plurality of metal articles each having a wide portion and a relatively narrow elongated portion extending therefrom, which comprises the steps of roll-forging a billet lengthwise to reduce the same in transverse cross-section relative to and intermediate the two end portions thereof, cutting such roll-forged billet in two in such reduced portion to form two blanks, each having a large end portion and a small end portion, thereafter further working each such blank individually by drawing such large end portion to form a neck in such large end portion substantially reduced over a substantial longitudinal extent with a thicker portion to either side of such neck, forming the outer extremity of such large end portion into a reduced outwardly tapering portion, and then forging each such blank to form simultaneously a pair of such articles having their respective wide portions adjacent each other and their respective narrow elongated portions extending in opposite directions.

WILLIAM W. CRILEY.

REFERENCES CITED

The following references are of record in the file of this patent:

UNITED STATES PATENTS

| Number | Name | Date |
|---|---|---|
| 369,488 | Wellman | Sept. 6, 1887 |
| 456,570 | Hill | July 28, 1891 |
| 655,721 | Lanz | Aug. 14, 1900 |
| 881,399 | Hansen | Mar. 10, 1908 |
| 1,101,813 | Rice | June 30, 1914 |
| 1,446,447 | Bingham | Feb. 27, 1923 |
| 1,470,413 | Wilcox | Oct. 9, 1923 |
| 1,474,516 | Eicher | Nov. 20, 1923 |
| 1,707,778 | Witherow | Apr. 2, 1929 |
| 1,756,376 | Moore | Apr. 29, 1930 |
| 2,201,071 | Baugnee | May 14, 1940 |
| 2,239,203 | Rendleman | Apr. 22, 1941 |
| 2,303,784 | Archer | Dec. 1, 1942 |